United States Patent
Yang et al.

(10) Patent No.: US 8,325,998 B2
(45) Date of Patent: Dec. 4, 2012

(54) MULTIDIRECTIONAL FACE DETECTION METHOD

(75) Inventors: Tai-Chang Yang, Fongshan (TW); Hong-Long Chou, Taipei (TW); Yin-Pin Chang, Taipei (TW)

(73) Assignee: Altek Corporation, Hsinchu (TW)

( * ) Notice: Subject to any disclaimer, the term of this patent is extended or adjusted under 35 U.S.C. 154(b) by 1033 days.

(21) Appl. No.: 12/328,891

(22) Filed: Dec. 5, 2008

(65) Prior Publication Data

US 2009/0169066 A1 Jul. 2, 2009

(30) Foreign Application Priority Data

Dec. 31, 2007 (TW) .............................. 96151599 A

(51) Int. Cl.
*G06K 9/00* (2006.01)
(52) U.S. Cl. .................. 382/118; 340/5.53; 340/5.83
(58) Field of Classification Search ................ None
See application file for complete search history.

(56) References Cited

U.S. PATENT DOCUMENTS

| | | | | |
|---|---|---|---|---|
| 5,550,928 A | * | 8/1996 | Lu et al. | 382/116 |
| 5,561,718 A | * | 10/1996 | Trew et al. | 382/118 |
| 5,629,752 A | * | 5/1997 | Kinjo | 355/35 |
| 6,016,148 A | * | 1/2000 | Kang et al. | 345/622 |
| 6,173,069 B1 | * | 1/2001 | Daly et al. | 382/118 |
| 6,529,630 B1 | * | 3/2003 | Kinjo | 382/190 |
| 7,035,456 B2 | * | 4/2006 | Lestideau | 382/164 |
| 7,916,897 B2 | * | 3/2011 | Corcoran et al. | 382/103 |
| 2001/0053292 A1 | * | 12/2001 | Nakamura | 396/661 |
| 2005/0147278 A1 | * | 7/2005 | Rui et al. | 382/103 |

OTHER PUBLICATIONS

Viola et al. (2001) "Rapid object detection using a boosted cascade of simple features." Proc. 2001 IEEE Comp. Sci. Conf. on Computer Vision and Pattern Recognition, vol. 1 pp. 511-518.*

* cited by examiner

*Primary Examiner* — Barry Drennan
(74) *Attorney, Agent, or Firm* — Workman Nydegger

(57) ABSTRACT

A multidirectional face detection method is for detecting a face in a picture under detection at different positions. The face detection method includes the steps. A selecting window sets to sequentially select different sub-image patterns from the picture under detection. A facial feature weight calculates and it is calculated according to a feature value of the pixels in a sub-image pattern selected by the selecting window, thereby determining if the sub-image pattern has any features similar to the face. A facial edge weight calculates for made on the picture under detection according to a boundary value of the pixels in the sub-image pattern selected by the selecting window, so as to determine if the part of area of the picture under detection has any facial-boundaries. Profile detection is performed to respectively mark the facial-boundaries in the sub-image patterns with arc segments respectively for the sub-image patterns having the facial-boundaries.

5 Claims, 5 Drawing Sheets

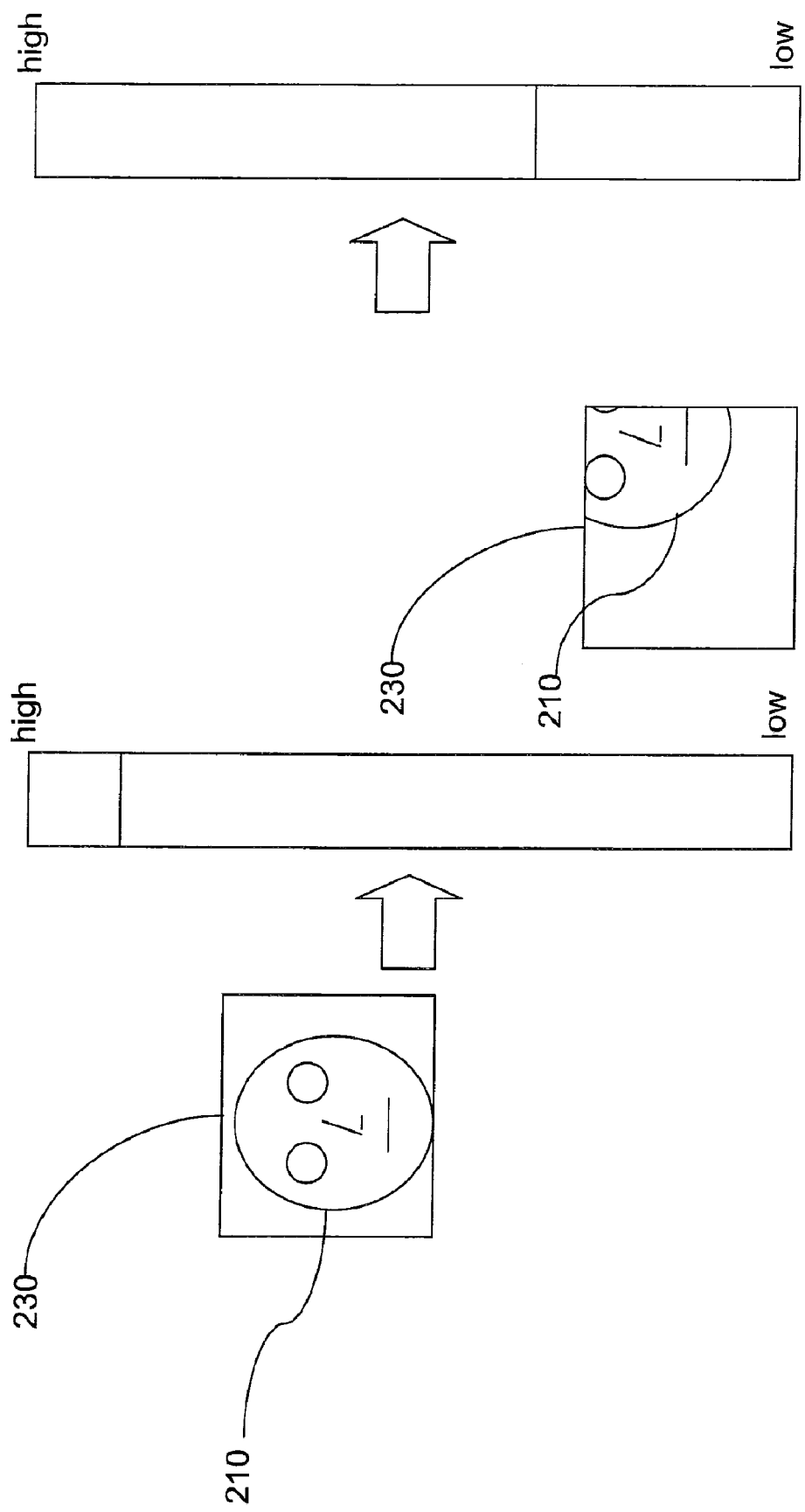

MULTIDIRECTIONAL FACE DETECTION METHOD

CROSS-REFERENCE TO RELATED APPLICATIONS

This non-provisional application claims priority under 35 U.S.C. §119(a) on Patent Application No(s). 096151599 filed in Taiwan, R.O.C. on Dec. 31, 2007 the entire contents of which are hereby incorporated by reference.

BACKGROUND OF THE INVENTION

1. Field of Invention

The present invention relates to a face detection method, and more particularly to a face detection method for detecting a face in a picture under detection at different transposed positions.

2. Related Art

In recent years, human facial recognition systems have paid great attention from research scholars and the industry and have been deeply expected to show excellent performance on public security or door-forbidden systems. However, such kinds of systems are always influenced by external factors such as light rays or complex textures, and thus reducing a success rate of recognition.

In order to solve the above influences of the external factors, it is suggested to use different image features to effectively detect a face in a picture under detection. In general, the most common face detection method utilizes a learning model to memorize multiple pictures to be detected. The learning model learns to recognize if the pictures under detection contain the preset image features according to the preset image features. Both the active learning architecture, for example, a neural network, an expert system, a fuzzy system, and the classified learning architecture, for example, a support vector machine (SVM), a principal components analysis (PCA), a SNoW method, a boosting method need to perform learning behaviors according to the set image features. Therefore, how to create the learning model and select proper image features are crucial for the face detection determination.

In order to distinguish a face from a background in a picture under detection, a Haar-like algorithm is often utilized to retrieve facial features. The Haar-like algorithm is a method for performing a feature processing on a textural directionality of patterns. Therefore, the Haar-like algorithm can effectively distinguish the face from the complex background. Also because the Haar-like algorithm depends on the textural directionality in the picture under detection, when the picture under detection is transposed to different directions, e.g., transposed by 90, 180 or 270 degrees, the original training samples obtained by the Haar-like algorithm would not be applicable to the transposed picture under detection.

In order to detect the face in the picture under detection at different transposed positions, the Haar-like algorithm is utilized again to perform a learning training on the picture under detection at different transposed positions repeatedly. In this manner, the memory space as well as the operation time is greatly increased.

Additionally, in order to determine a size of the face, an ellipse mask selection method is generally used to determine a size of area of the face in the picture under detection. In an edge image with good inspected quality, contours of the face and head portions can be regarded to be approximately elliptical shaped. Referring to FIGS. 1a and 1b, since the conventional ellipse mask has a fixed major to minor axis ratio, a problem that a circled area is incomplete will occur no matter a large ellipse mask or a small ellipse mask is used. If the face 120 in the picture under detection 100 is larger, a larger ellipse mask 110 is used to select the face 120. Similarly, if the face 120 in the picture under detection 100 is smaller, a smaller ellipse mask 110 is used to select the face 120.

SUMMARY OF THE INVENTION

In view of the above problems, the present invention is mainly directed to a multidirectional face detection method for detecting a face in a picture under detection at different transposed positions.

In order to achieve the above objectives, the multidirectional face detection method disclosed in the present invention includes the following steps. A selecting window is set to sequentially select different sub-image patterns from the picture under detection. A facial weight is calculated according to a feature value of each of pixels in the sub-image pattern selected by the current selected selecting window. A facial edge weight is calculated and the calculation is made on the picture under detection according to a gradient value of each of the pixels in the sub-image pattern selected by the current selected selecting window to determine if this part of area of the picture under detection has any facial boundaries. A profile detection is performed to respectively mark the facial boundaries in the sub-image patterns with a plurality of arc segments respectively for the sub-image patterns.

The present invention determines the probability that the picture under detection has a face by use of the weights of facial features and facial edges included in various sub-image patterns and marks an appearance of the face in the picture under detection by means of the profile detection. Thus, the previous training results can also be used in picture under detection after transposed without discrimination. The face in the picture under detection can be detected without training the transposed picture under detection again.

BRIEF DESCRIPTION OF THE DRAWINGS

The present invention will become more fully understood from the detailed description given herein below for illustration only, and thus are not limitative of the present invention, and wherein:

FIG. 3a is a corresponding relationship diagram of ranking of various sub-image patterns and feature values of a face;

FIG. 3b is a corresponding relationship diagram of ranking of various sub-image patterns and feature values of a face;

DETAILED DESCRIPTION OF THE INVENTION

The present invention provides a multidirectional face detection method for detecting an area of a face when a picture under detection is at different transposed positions. In this embodiment, the picture under detection is respectively transposed by 90, 180 and 270 degrees, which is first described herein. Preferred embodiments of the present invention include the following steps.

Step a

Figure 1B:
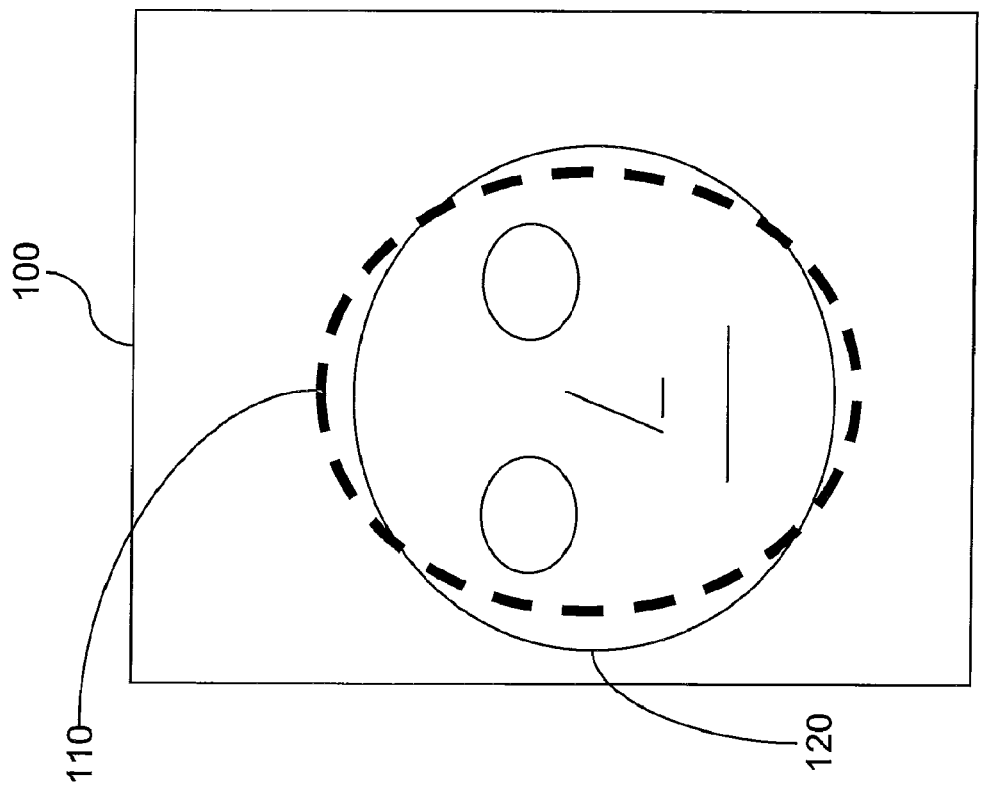
FIG. 1b is a schematic view of circling a face by use of an ellipse mask according to the prior art.
Figure 1A:
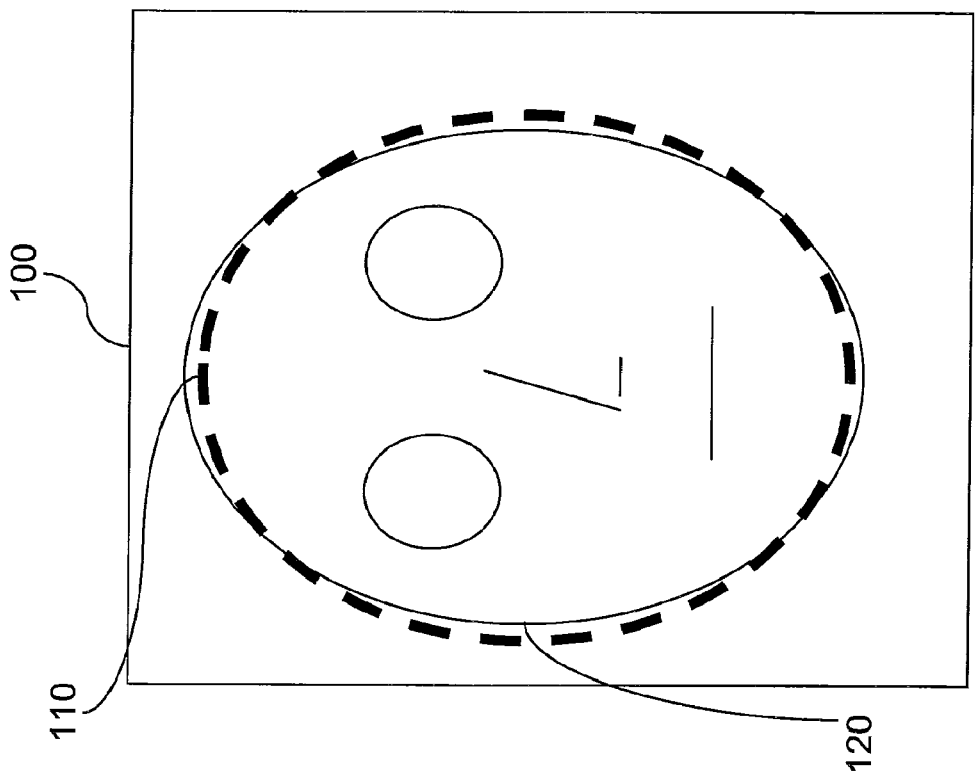
FIG. 1a is a schematic view of circling a face by use of an ellipse mask according to the prior art.
Figure 2:
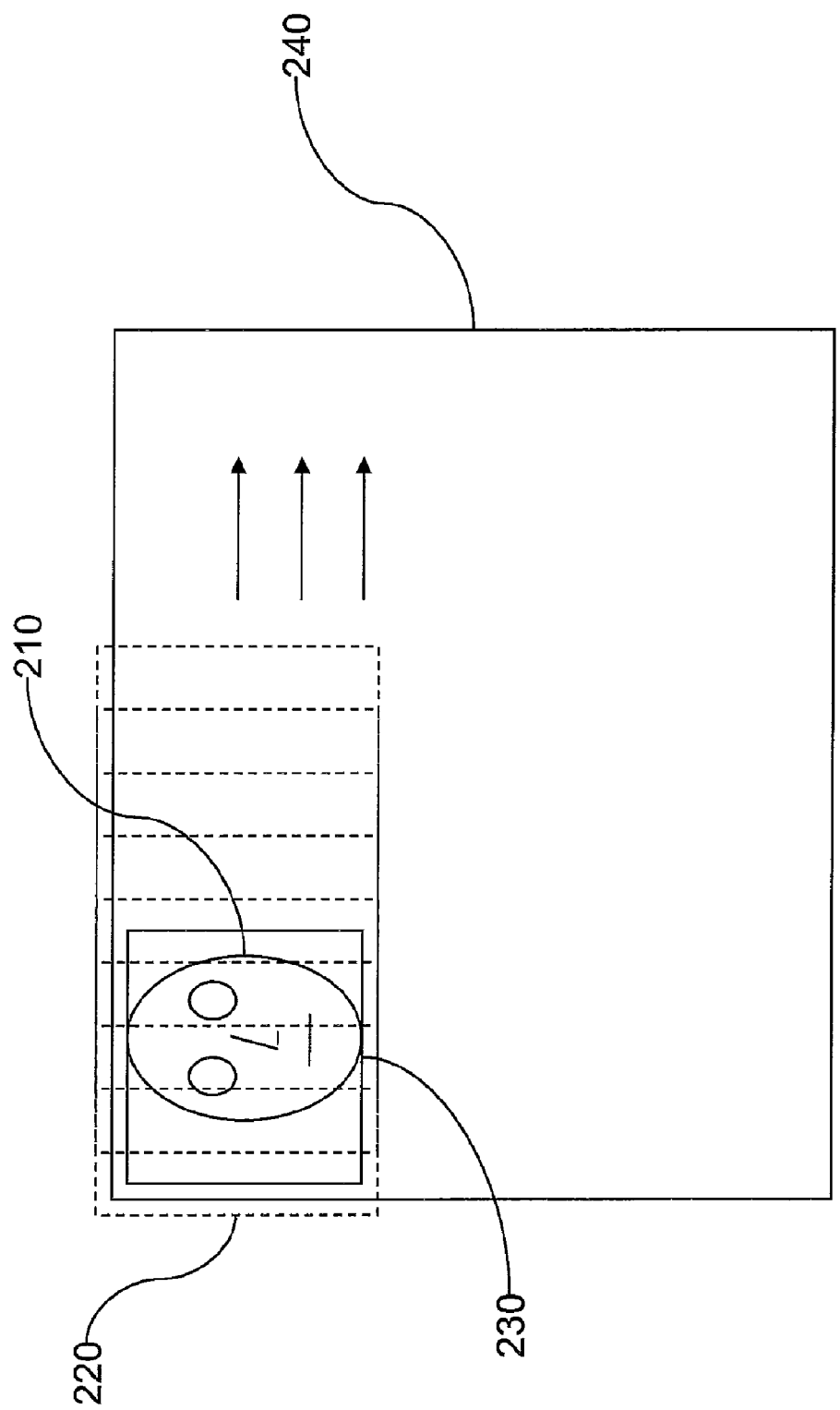
FIG. 2 is a schematic view of a picture under detection.

A selecting window is set, so as to sequentially select different sub-image patterns from the picture under detection. Referring to FIG. 2, it is a schematic view of the picture under detection. For clearly explaining this step of the present invention, a picture 240 under detection in FIG. 2 is expressed by an overlapping sub-image pattern 230. Then, a feature calculation order for the current sub-image pattern 230 is determined according to a position of a selecting window 220. In this embodiment, the picture 240 under detection is assumed to be 96*96 pixels, wherein a size of a face 210 is 24*24 pixels. A size of the selecting window 220 and each of the sub-image patterns 230 is set to be 24*24 pixels and the selecting window 220 may vary in different ranges according to different implementation aspects. Pattern size does not necessary be fixed as a square size, it could be any size of m*n. After the selecting window 220 progressively scans the picture 240 under detection from left to right and from top to bottom, a selecting window 220 close to the face 210 higher than a specified threshold will be obtained.

Step b

A facial weight is calculated and the facial feature weight is calculated according to a feature value of each of pixels in the selecting window 220.

Step c

A facial edge weight is calculated and the calculation is made on the picture 240 under detection according to a color value of each of the pixels in the current selected selecting window 220 to determine if this part of area of the picture 240 under detection has any facial boundaries.

A training will be performed before this step of calculating the facial feature weight and the facial edge weight. A boosting algorithm is used to perform the ranking training on feature values of multiple different facial pictures under detection to obtain a feature model according to training results. Feature values of other pictures 240 to be detected are ranked in a prioritized order according to this feature model.

In this embodiment, colors are utilized for illustration. If depth variations of gray level values are utilized as feature values of various sub-image patterns 230 of the picture 240 under detection, the current selecting window 220 will obtain a higher facial similarity if the current selecting window 220 has more correct features of the face 210. Each of the sub-image patterns 230 has a size of 24*24 pixels, i.e., the sub-image pattern 230 has 576 pixels. If color depth variations of each of the pixels are used as feature values, one sub-image pattern has (24−2)×(24−2)=484 feature values. Referring to FIGS. 3a and 3b, the correspondence relationship diagrams of ranking of various sub-image patterns and similarity of a face are shown. The left of FIGS. 3a and 3b is a sub-image pattern 230 and the right is a facial similarity. The upper, the corresponding similarity is higher, and vise versa. FIGS. 3a and 3b illustrate the selecting window 220 containing the face 210. However, because in FIG. 3a, the face 210 is right in the middle of the selecting window 220, the result of the similarity thereof is higher than that of the similarity in FIG. 3b.

Step d

Figure 4B:
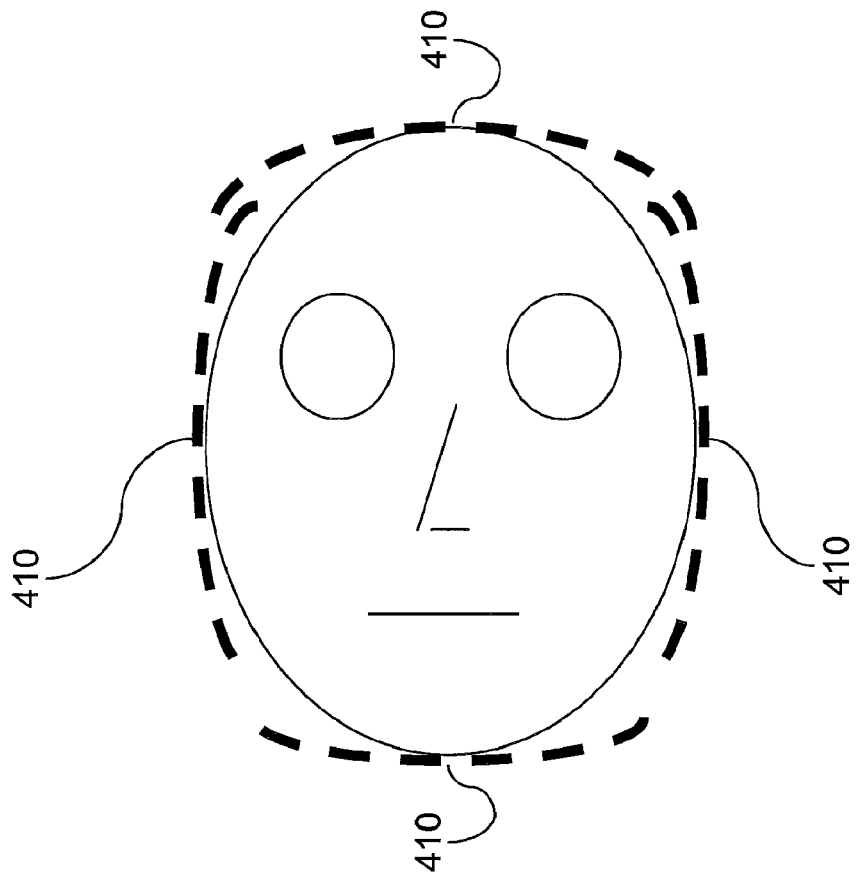
FIG. 4b is a schematic view of circling a face by use of arc segments according to the present invention.
Figure 4A:
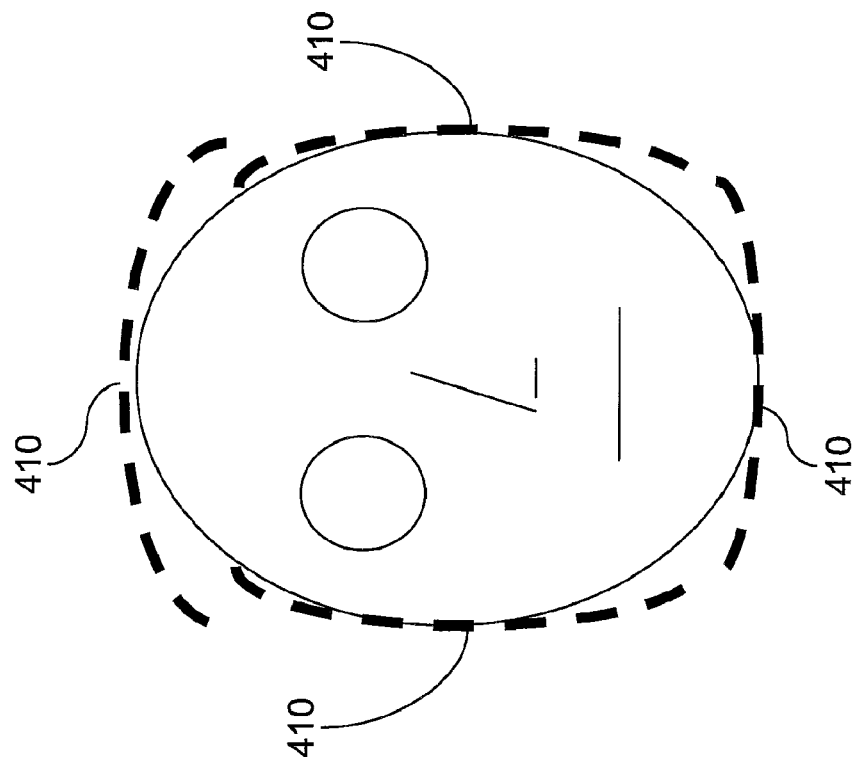
FIG. 4a is a schematic view of circling a face by use of arc segments according to the present invention.

A profile detection is performed to respectively mark the facial boundaries in the sub-image patterns 230 with a plurality of arc segments 410 respectively for the sub-image patterns 230 having the facial boundaries. Although the face 210 can be regarded to be an approximately elliptical shape, a part of the areas of the face 210 is unable to be circled if a conventional ellipse mask is used to circle. Therefore, referring to FIGS. 4a and 4b, the present invention divides an elliptic curve into a plurality of arc segments 410 and connects sub-image patterns 230 having adjoining facial boundaries by the use of the arc segments 410.

Figure 5:
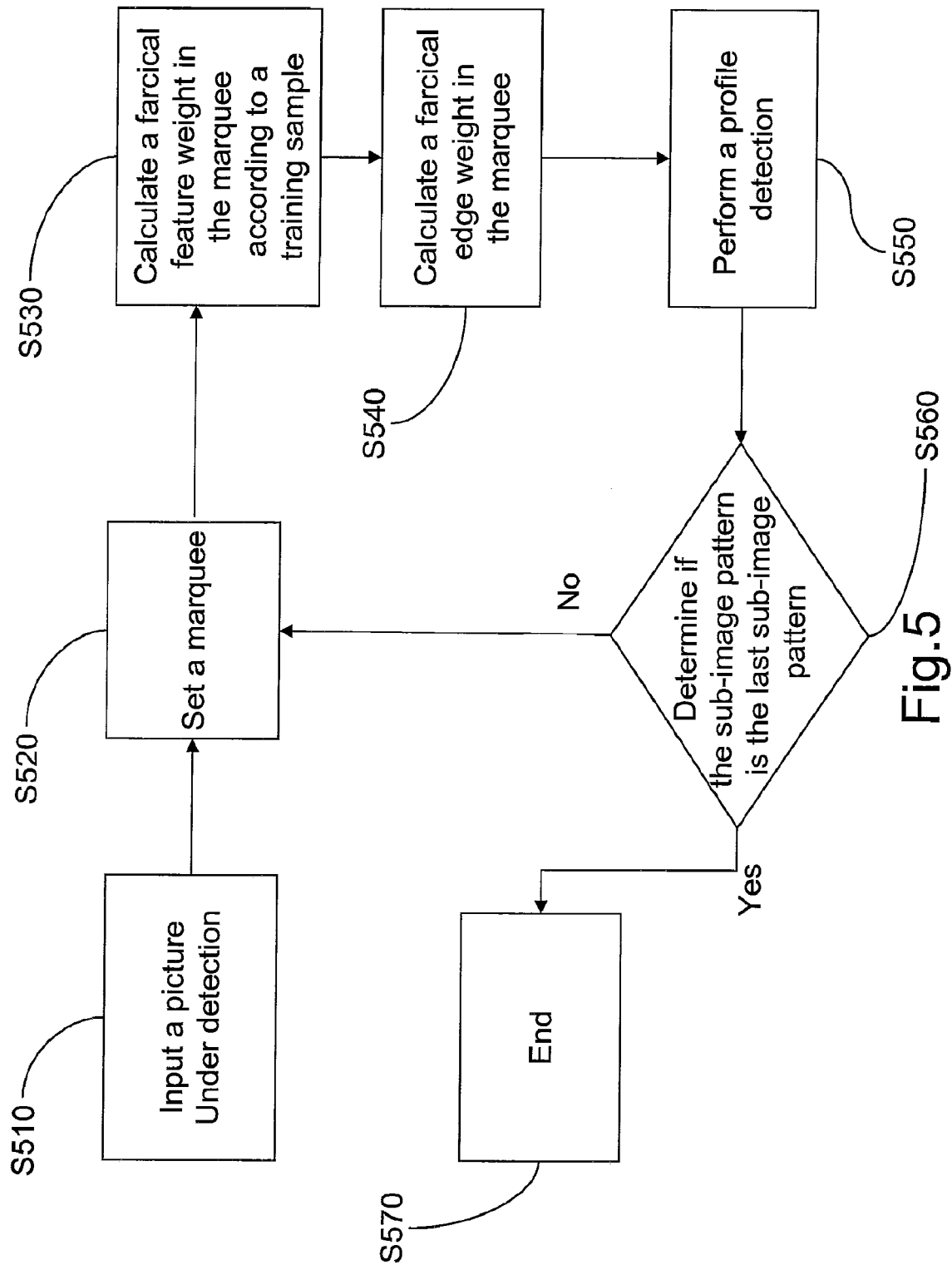
FIG. 5 is an operation flow chart of the present invention.

In order to clarify an operation flow of the present invention, referring to FIG. 5, an operation flow chart of the present invention is shown. First, a picture under detection is input (step S510). A selecting window is set (step S520), so as to select various sub-image patterns 230 from the picture 240 under detection. A facial feature weight in the selecting window is calculated according to a feature model (step S530). A facial edge weight in the selecting window is calculated (step S540). A profile detection is performed (step S550) to mark facial boundaries of the sub-image patterns 230 by utilizing facial edge weight. Whether the sub-image pattern is the last sub-image pattern is determined (step S560). If yes, the calculation is ended (step S570). If not, the step S520 is performed.

The present invention determines an area of the face 210 in the picture under detection by use of the facial feature weight and the facial edge weight included in various sub-image patterns 230 and marks an appearance of the face 210 in the picture 240 under detection by use of the profile detection by utilizing facial edge weight. Thus, the previous training results can also be used in the picture 240 under detection after transposed without discrimination. The face 210 in the picture 240 under detection can be detected without training the transposed picture 240 under detection again.

What is claimed is:

1. A multidirectional face detection method for selecting a face in a picture under detection at different transposed positions, comprising:
    setting a selecting window to sequentially select a different sub-image pattern from the picture under detection;
    calculating a facial feature weight according to a feature value of each of pixels in the sub-image pattern selected by the selecting window, thereby determining if the sub-image pattern contains a face;
    calculating a facial edge weight according to a color value of each of the pixels in the sub-image pattern selected by the selecting window to determine if the sub-image pattern selected by the selecting window has any facial boundaries; and
    performing a profile detection to respectively mark the facial boundaries in the sub-image patterns with a plurality of arc segments respectively for the sub-image patterns having the facial boundaries, wherein some of the plurality of arc segments have a different major focus.

2. The multidirectional face detection method according to claim 1, wherein the facial feature weight calculation comprises:
    performing a training to determine a priority value of the feature value of each of the pixels in the selecting window.

3. The multidirectional face detection method according to claim 2, wherein the training is a boosting algorithm.

4. The multidirectional face detection method according to claim 1, wherein the selecting window has a size of an area of m*n pixels.

5. The multidirectional face detection method according to claim 1, wherein a combined area of the arc segments constitutes an elliptic area.

* * * * *